United States Patent [19]

Tynan, Jr.

[11] Patent Number: 5,656,347
[45] Date of Patent: *Aug. 12, 1997

[54] RELEASE COATING FOR SILICONE PRESSURE SENSITIVE ADHESIVES

[75] Inventor: John K. Tynan, Jr., Port Huron, Mich.

[73] Assignee: American Tape Co., Marysville, Mich.

[ * ] Notice: The term of this patent shall not extend beyond the expiration date of Pat. No. 5,451,440.

[21] Appl. No.: 422,073

[22] Filed: Apr. 13, 1995

Related U.S. Application Data

[63] Continuation of Ser. No. 100,103, Jul. 30, 1993, Pat. No. 5,451,440.
[51] Int. Cl.⁶ .................................................. C09J 7/02
[52] U.S. Cl. .................... 428/40.1; 428/353; 428/354; 428/421; 428/422; 428/447; 428/448; 428/451; 428/474.4; 428/480; 428/481; 428/482; 428/483; 428/355 CN; 524/512; 524/524; 524/528; 525/200; 525/474; 525/477
[58] Field of Search ....................... 428/40.1, 354, 428/355, 353, 421, 422, 447, 448, 451, 474.4, 480–483; 525/474, 200, 477; 524/512, 524, 528; 206/411

[56] References Cited

U.S. PATENT DOCUMENTS

| | | | |
|---|---|---|---|
| 4,513,059 | 4/1985 | Dabroski | 428/354 |
| 5,281,455 | 1/1994 | Braun | 428/40 |
| 5,451,440 | 9/1995 | Tynan | 428/40 |

*Primary Examiner*—Nasser Ahmad
*Attorney, Agent, or Firm*—Thompson Hine & Flory LLP

[57] ABSTRACT

A laminate comprising a substrate, a continuous layer of a release coating on one surface thereof, and a layer of a silicone pressure sensitive adhesive on the surface of said release coating, said release coating being a mixture of a resin having perfluoro side chains and a film forming resin which binds said resin having said perfluoro side chains to said substrate, wherein said film forming resin is selected from the group consisting of polyester, polyamides, functionalized polyolefins, and nitrile polymers and copolymers.

24 Claims, No Drawings

RELEASE COATING FOR SILICONE PRESSURE SENSITIVE ADHESIVES

This is a continuation of application Ser. No. 08/100,103 filed Jul. 30, 1993, now U.S. Pat. No. 5,451,440.

BACKGROUND OF THE INVENTION

The present invention relates generally to the release of silicone pressure sensitive adhesives, herein called SPSAs. In a particular aspect, this invention relates to curable coating compositions and to articles of manufacturing comprising the cured coatings.

SPSAs, such as those disclosed in U.S. Pat. Nos. 2,736,721; 2,814,601; 2,857,356; 3,528,940; 3,929,704; 3,983,298; 4,309,520; Canadian Patent No. 711,756 and British Patent No. 998,232 are well known for their excellent thermal stability and tenacious adhesiveness. While these properties are valuable, the adhesiveness, e.g., tack and/or adhesive strength, of SPSAs presents a significant problem. Whether the SPSA is in the form of roll of tape, an adhesive layer on an article protected with a peelable backing, or a transfer adhesive layer protected on two surfaces by peelable backings, the SPSA must be separated from an adjacent surface provided with a release layer before it can be used for its intended purpose. Because of its tenacious adhesiveness specially designed release coatings are required for SPSA's.

Conventional release films which have been used with organic pressure sensitive adhesives (OPSAs) are generally unsuitable for use with SPSAs for a number of reasons. They may provide too tight release, i.e., too much force (the release force) may be required to remove the adhesive coated substrate from the release surface and in an extreme case the adhesive coated substrate may tear; they may not be sufficiently cohesive, e.g., the release coat may be displaced by the adhesive and transfer to the adhesive surface thereby reducing adhesive effectiveness; or when the SPSA is cast directly on the release backing the release film may provide unacceptably tight release or the SPSA may be contaminated with the release agent.

One class of release backing which has been found to be suitable for use with SPSA's employs fluorosilicone polymers. Examples of this type of backing are provided in U.S. Pat. Nos. 5,132,366; 4,980,443; 4,968,766; 4,889,753; 4,842,902; 4,736,048. This system has been found to suffer from several drawbacks which limit its usefulness. There is often a need to adjust the release properties of a backing and it is very difficult to do this using the fluorosilicone system because the perfluoro monomer is reacted into the fluorosilicone polymer off-site. Thus, the system has a fixed fluorine content which determines the release force and it is difficult to control the release properties of the coating and thereby tailor its release properties to the particular needs of the particular adhesive system with which the polymer is used. In addition, the fluorosilicone polymers are comparatively expensive which makes the release coating undesirable for use on paper or highly textured or absorbent substrates. From a practical standpoint, this limits the economic usefulness of the coating to application to films.

Release coatings which contain polymers including perfluoro groups are known in the art. For example, U.S. Pat. No. 4,523,059 to Dabroski discloses aqueous release coating compositions containing polymers derived from perfluoroalkylalkyl acrylates. U.S. Pat. No. 4,873,140 to Mcintyre discloses a coating of an in situ polymerized poly (perfluoropropylenoxy) acrylate or methacrylate. U.S. Pat. No. 4,472,480 to Olson discloses a perfluoropolyether release coating. U.S. Pat. No. 3,536,749 to Grones discloses an acrylate adduct of a fluorocarbon amide.

U.S. Pat. No. 3,502,497 to Crocker discloses a release coating comprising a copolymer of stearyl methacrylate and acrylonitrile, a release agent, and a film forming composition based upon an alkyd resin.

An improved release backing for pressure sensitive adhesives (PSAs), and particularly, SPSAs is thus needed in the adhesive industry.

SUMMARY OF THE INVENTION

It is an object of this invention to provide an improved release backing for SPSAs. It is a more particular object of this invention to provide an improved article comprising a layer of SPSA which is protected by a peelable release backing. It is an additional object of this invention to provide a particularly preferred release coating composition for preparing a surface that will release a SPSA and which can also be used in releasing aggressive organic pressure sensitive adhesives (OPSAs).

These objects and others, which will be apparent upon considering the following disclosure and appended claims, are obtained by the present invention which, briefly stated, provides a laminate comprising a substrate, a layer of a release coating on one surface of the substrate, and a layer of a silicone pressure sensitive adhesive on the surface of the release coating, the release coating being a mixture of a resin having perfluoro side chains and a film forming resin which binds the resin having the perfluoro side chains to the substrate; and provides a coating composition useful in providing a release coat which comprises a resin having perfluoro side chains, a polyester resin, an aminoplast resin and a curing catalyst. This coating can be used to release OPSAs and SPSAs.

Surprisingly, it has been found that the composition of this invention succeeds where compositions of the prior art fail in the release of SPSAs.

DETAILED DESCRIPTION OF THE INVENTION

In accordance with the invention, a resin having perfluoro side chains (hereinafter a "perfluororesin") and a film forming resin are selected having a degree of polymer compatibility which allows the perfluoro groups to concentrate on the surface of the coating while the perfluororesin remains bound to the substrate surface by the film former resin. The term "perfluoro" as used herein includes perfluoroalkyl groups having 4 to 14 carbon atoms and other perfluoro side chains of 4 to 14 carbon atoms known in the art. If the perfluororesin and the film forming resin are not sufficiently compatible, the composition can not be coated uniformly without separation, the perfluororesin will be fugitive and/or contaminate the adhesive through off set or the like. If they are too compatible, the perfluoro groups will remain dissolved in the film former and the perflurogroups will not concentrate on the surface of the coating and reduce surface energy as desired. As an example of compatibility, when a polyester resin is used as the film former, because the polyester resin is relatively polar in character, a perfluororesin with some polar character provides the desired compatibility. Preferred perfluororesins for use with polyesters have perfluoro groups and, more particularly perfluoroalkyl groups as side chains which extend from a polar resin backbone such as a polyacrylate.

Representative examples of useful perfluororesins are resins having perfluoro side chains extending from a polymeric backbone and include polyethers, polyacrylates, polymethacrylates, etc. having perfluoro side chains, many of which have been described in the literature. See U.S. Pat. Nos. 4,873,140; 4,472,480; and 3,536,749 for examples of perfluororesins. Useful resins may be derived from any of the ZONYL fluorochemical intermediates available from the DuPont Company including its fluorotelomers, its fluoroalcohols, its fluoroolefins, its fluoroalkylacrylates, its fluoroalkylmethacrylates, its fluoroalkylstearates, its fluoroalkylcitrate, its fluoroalkylthiocyanate and its fluoroalkylsulfonic acid. These intermediates may be reacted with themselves or co-polymerized with other monomers to provide a main chain which is compatible with the film forming resin. The comonomer may be an acrylate or a methacrylate, a nonacrylate ester such as, vinyl acetate, or a vinyl monomer. Preferably, the perfluoro resins have a fluorine content of about 45 to 70% and more particularly 30 to 50%.

In accordance with the preferred embodiments of the invention, the perfluoropolymer is a perfluorinated ester polymer. These polymers are homopolymers and copolymers of ω-perfluoroalkylalkyl acrylates. By ω-perfluoroalkylalkyl acrylate is meant a structure which may be represented as

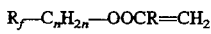

$$R_f—C_nH_{2n}—OOCR=CH_2$$

wherein $R_f$ represents $F[CF_2]_p$ and n and p are 4 to 14. Perfluoroalkylalkyl acrylate polymer compositions are available commercially as aqueous dispersions which may contain polymerizable monomers and/or polymerizable or cross-linkable oligomers. A particularly suitable fluropolymer composition is commercially available from DuPont under the name ZONYL 7040.

While not desiring to be bound it is believed that upon curing the coating composition of the present invention an interpenetrating network of the perfluororesin in the film forming resin is formed which binds the perfluororesin to the substrate and prevents its transfer to the PSA. The fluorochemical nature of the perfluoro groups in the resin allows them to extend from the network to provide a surface having low surface energy.

The film forming resin used in the present invention must exhibit the compatibility characteristic with respect to the perfluororesin described above. Useful film formers include polyester resins, polyamides, functionalized polyolefins such as functionalized polypropylenes and functionalized polyethylenes, nitrile polymers and copolymers, etc. The preferred film formers are polyester resins.

A variety of polyester resins may be used as film formers in the invention including polyesters of aromatic dicarboxylic acids or anhydrides such as terephthalic anhydride, phthalic anhydride, etc. The term "polyester resin" includes alkyd resins as a preferred embodiment thereof.

Alkyd resins are the condensation product of a polycarboxylic acid, a polyol, and an oil. Polycarboxylic acids such as, for example, oxalic acid, malonic acid, succinic acid, sebacic acid, adipic acid, pimelic acid, suberic acid, azelaic acid, tricarballylic acid, citric acid, tartaric acid, maleic acid, phthalic acid, isophthalic acid, terephthalic acid, itaconic acid, citraconic acid, and mixtures thereof can, among others, be used in preparing the alkyl resins employed in this invention. Of course, any of the anhydrides of the aforementioned acids can be used in equivalent amounts in place of the acids. Phthalic acid or anhydride is a preferred constituent of the polycarboxylic acid component.

Typical polyots useful in the alkyd resin are, for example, ethylene glycol, diethylene glycol, tetramethylene glycol, pinacol, trimethylol propane, trimethylol ethane, mannitol, sorbitol, glycerol, pentaerythritol and mixtures thereof. Glycerol is a preferred polyol. Coconut oil alkyd resins have been found to be particularly useful. One coconut oil alkyd resin which is useful in the invention is Doresco AKN29.1 from Dock Resins, Inc. This resin is a condensation product of phthalic anhydride, coconut oil fatty acids and glycerine.

Examples of functionalized polyolefins include sulfonated and chlorinated polyolefins such as sulfonated or chlorinated polyethylenes and polypropylenes, malaeic anhydride adducts of sulfonated, chlorinated polyolefins, such as DuPont Co. HYPALON polymers, etc.

Examples of nitrile polymers and copolymers include carboxyl terminated or amine terminated acrylonitrile resins such as Hycar 1300X8, 1300X9, 1300X13 from B. F. Goodrich.

The film former is selected based on the thermal stability of the substrate or vice versa. Film forming resins requiring elevated temperatures for curing will be used with thermally stable substrates. For example, alkyd systems are used with substrates like PET which are stable whereas film formers which are simply dried may be used with less stable substrates such as polyolefins films.

Depending upon the nature of the film former, it may be necessary or desirable to include a crosslinking agent in the composition. When using a polyester or an alkyd resin, the coating composition preferably includes an aminoplast resin. Any of the conventional aminoaldehyde resins which are compatible with the other resins in the composition can be used. Such aminoaldehyde resins are formed by the reaction of polyamines such as, for example, melamine and urea with aldehydes such as formaldehyde, acetaldehyde and furfural. Preferred resins are prepared by reacting urea or melamine with a molar excess of formaldehyde, then etherifying the resulting methylol melamines or methylol ureas with, for example, methyl, ethyl, propyl or butyl alcohol. Butylated urea-formaldehyde and melamine-formaldehyde resins and partially condensed methoxy methylol melamines are particularly preferred.

The aforementioned conventional-alkyd resins and amino-aldehyde resins and mixtures thereof are described in more detail in U.S. Pat. Nos. 2,191,957, 2,197,357, and 2,218,474. A particularly preferred resin is a butylated melamine formaldehyde resin such as Doresco BM8-1 commercially available from Dock Resins, Inc.

Other conventional crosslinking agents can be used to cure the film former include phenolics, epoxies, and polyisocyanates. While it is preferred to use a combination of a coconut oil alkyd and butylated melamine formaldehyde, by adjusting the amounts of the resin and the crosslinker other combinations of resins and crosslinkers may be used in the invention which provide a combination of cohesive strength and adhesion to substrate useful in the release coatings.

The removal force is dependent upon the ratio of resin (e.g., alkyd) to crosslinker (e.g., melamine), the level of perfluorinated ester, and the crosslink density of the coating and can be adjusted as such. The ratio of the polyester or alkyd resin to the aminoplast resin or crosslinker is a principal factor in determining the cohesive strength of the coating and its adhesive strength to the substrate surface, i.e., the surface carrying the release coating. Ordinarily the coating may contain from about 40 to 90 parts (dry weight) alkyd and 10 to 50 parts aminoplast. Preferably, the coating contains about 65 to 75 parts of the alkyd resin and 10 to 20 parts of the aminoplast resin. With increasing amounts of the aminoplast, the coating tends to become brittle. As the amount of the aminoplast decreases below acceptable levels, the coating loses strength.

To cure coatings of a polyester or alkyd resin and an aminoplast resin, an acid catalyst may be incorporated into the composition. Those skilled in the art will appreciate that a variety of catalysts may be used for this purpose. Suitable catalysts include, for example, octyl acid phosphate, amyl acid phosphate, butyl acid phosphate, ortho-phosphoric acid and citric acid. Although the aforementioned catalysts are not essential, they do materially shorten the drying and curing time and hence the processing time, for tapes, labels, and the like made with the release coating of this invention. Some of the more commonly preferred catalysts are p-tuluenesulfonic acid, alkyl acid phosphates, etc. The amount of the catalyst is not particularly critical. A suitable amount is used to provide the desired cure rate and can vary from 0 to 12%. Typically about 0.5 to 3% of catalyst is sufficient.

The tightness of the release or the force required to remove the release film from the PSA layer can be adjusted by adjusting the amount of the fluororesin in the coating. The amount and tightness of release will also vary with the nature of the fluororesin and the surface character of the surface upon which the coating is coated. For SPSAs, the fluororesin is generally present-in the coating composition in an amount of about 2 to 10% by weight (dry weight).

While release coatings in accordance with the invention are particularly useful because they release SPSAs, those skilled in the art will appreciate that these coatings can also be used with OPSAs which are generally less aggressive than SPSAs. For OPSAs somewhat lower amounts of fluororesin may be used, for example, for OPSAs the amount may range from about 0.25 to 5% by weight (dry).

In some cases it may be desirable to reduce the adhesive strength of an adhesive to reduce the release force. One technique that can be used to reduce the release force is to modify the PSA to include small amounts of the fluropolymer. By incorporating controlled amounts of the fluropolymer in the adhesive, the adhesive bond to the release coating can be reduced. For example additions of about 0.25% to 2.0% dry weight to the OPSA or SPSA have been found helpful in controlling release.

The coating components can be mixed together and applied directly to a substrate. If desired a solvent may be added to the composition to enhance coating properties. Any of a wide variety of aliphatic, aromatic and cycloaliphatic hydrocarbons, alcohols, ketones, ethers and esters such as, for example, ethyl, propyl, butyl and isobutyl alcohols, xylene, toluene, glycol ethyl ether, glycol monacetate, diacetone alcohol and butyl ether can be used as solvents for the coating composition. Mixtures of alcohols and aromatic hydrocarbons may be preferred as solvents because of the high mutual solubility of amino-aldehyde and alkyd resins therein. The choice of the solvent and the amount used will depend on the coating method and drying equipment used. Generally about 50 to 75% solvent (wet basis weight) may be used.

Any conventional coating technique can be used to apply the release coating composition to the substrate such as brushing, spreading, rolling, wire or knife coating, roll coating, gravure coating, transfer roll coating, air knife or doctor blade coating. The coating can be successfully applied with direct gravure, reverse gravure, single or double Mayer rod, knife-over-roll, and inverted knife techniques. The technique is selected for the substrate to be coated. The coating viscosity is adjusted for the coating technique. The coating solids is adjusted to provide the requisite coating viscosity.

To any article or substrate on which the coating has been applied, dried and cured, an SPSA adhesive, which has been previously dried and crosslinked, can be applied and easily removed. The release coating can be applied to any suitable substrate. Some of the most common substrates are flexible films, papers, cloth, foils, glass and metal. Both creped and uncreped papers may be used. Useful films include polyesters, e.g., PET, polyolefins, polycarbonates and metallized films such as aluminized polyethylene-teraphthalate (PET).

The coat weight of the coating will vary depending upon many factors including the nature of the substrate, for example, its absorbency, porosity, surface roughness, crepe, etc., whether the substrate is a film or paper and whether the paper is impregnated. Generally, the release coating is applied in an amount ranging from about 0.5 to 5 pounds dry weight per 3,000 sq. ft. Film, foil, and super calendared kraft substrates are typically coated with 35% solids material by direct or reverse gravure techniques to a dry coating weight of 0.5 to 1.5 pounds per 3,000 sq. ft. ream. Coarse paper substrates, such as crepe or flatback, are typically coated with 35 to 45% solids material by any of the aforementioned techniques to a dry coat weight of 2 to 6 pounds per 3,000 sq. ft. ream. While heavier coat weights may be used, this is generally economically undesirable. As previously mentioned, one advantage of the invention is that the release coat is economical for use on rough or more highly absorbent substrates.

In some cases, it may be desirable to use a primer coat to enhance the bond between the release coat and the substrate such that the cured release coating bonds to the substrate with a force greater than the force needed to remove the adhesive from the coating. For example, a primer coat may be used to maximize the bond between the release layer and a film such as PET or a foil. On the other hand, the primer is optional and the need for it will depend on the particular application. For example, while a primer is often used with non-matte PET, it is generally not required with matte PET.

A useful primer for PET may be prepared from a carboxyl terminated butadiene-acrylonitrile resin (CTBN) or an amine terminated butadiene-acrylonitrile (ATBN) resin, an aminoplast and, more particularly, butylated melamine formaldehyde resin and a catalyst such as p-toluene sulfonic acid. The CTBN or ATBN are reacted in an amount of about 3 parts to 1 part of the aminoplast resin. The catalyst is present in an amount of about 0.5 to 2%. Examples of CTBN or ATBN polymers are commercially available from B. F. Goodrich under the trade names HYCAR 1300X8, 1300X9, 1300X13, 1300X15, 1300X18 or 1300X31. Chlorinated or sulfonated maleic anhydride polymers such as DuPont's Hypalon CP-4281 and CP-429 may be used instead of the CTBN or ATBN polymers. The aminoplast may be CYMEL 303, 323, 373 or 350. The coating may be applied from a 25% solids solution in toluene in a coat weight of 0.5 to 1.0 pound per 3000 sq. ft. and dried and cured at 300° to 350° F. for about 5 to 30 seconds immediately prior to application of the release coating. The coating is successfully applied with direct gravure, reverse gravure techniques, and Mayer rod techniques.

Film and foil substrates are typically coated with the primer as a 25% solids solution material by direct or reverse gravure techniques to a dry coating weight of 0.5 to 1.5 pounds per 3,000 sq. ft. ream. The coating is dried and cured, prior to the application of the release coating, in much the same fashion as the release coating.

One primer can be compounded as follows:

| Material | Description | Dry % | Wet % |
| --- | --- | --- | --- |
| Hycar 1300X8 | Reactive liquid nitrile | 74.0 | 18.5 |
| Toluene | | — | 70.8 |
| Doresco BM8-1 | butylated melamine | 24.0 | 9.7 |
| Doresco G-17 | p-toluenesulfonic acid | 2.0 | 1.0 |

Other primers may be used in the invention depending upon the substrate in a manner well known in the art.

After applying the release coating composition to the substrate, the coating is heated to cure the coating and remove any solvent. Typically the coating will be heated to a temperature of about 300° to 350° F. for about 5–30 seconds to accomplish curing. Because of the low coating weights involved, drying is easily achieved. The dried coating must then be cured to ensure that the film forming matrix is fully crosslinked and that the perfluorinated side chains "bloom" to its surface. A time/temperature relationship exists for curing the coating. The time of the cure is a function of the temperature that the coating achieves. The temperature used is selected for the substrate to which the coating is being applied. Heavier or thicker articles will require more time to achieve the desired temperature for curing. Typically 5 seconds at 350° F. achieves the desired level of crosslink density and blooming for the coating.

The release coating composition of the invention can be used in any of the applications in which release coatings are typically applied including a release liner or slip sheet for mill stocks, a release liner for pressure-sensitive dye cuts, a processing aid for silicone rubber, etc.

In accordance with another embodiment of the invention, a self wound adhesive tape is provided. In this embodiment, the OPSA or SPSA may be coated on one side of a backing the opposite side of which carries the release coating.

It is also anticipated that the invention may be useful in providing a transfer pressure sensitive adhesive. In this type of laminated article the laminate typically further comprises a second release layer that is in contact with the PSA, such as the next turn if the article has the form of a roll or a separate release backing if the article has the form of a sheet. The laminate possesses the property of differential release whereby one of the release layers is more easily released from the PSA than the other release layer. Differing release forces are available through the use of coating compositions having different release forces (e.g., by varying the amount of fluoropolymer). Additionally, differing release forces may be inherently available when the PSA is solvent-cast onto one coated substrate and brought into adhesive contact with another substrate, identically coated, after it has been freed of solvent and, optionally, cured. Of course, a combination of these two methods can also be used to provide differential release.

The invention may also be useful in cases where the PSA is durably adhered to an item that is to be ultimately adhered to a support. Examples thereof include, but are not limited to, medical items, such as transdermal drug delivery items and ostomy devices; trim items, such as decorative emblems and protective strips that are applied to vehicles; and decals, such as instrument panel templates and labels. As noted above, these articles can be prepared by applying the PSA to the release backing and thereafter durably adhering the item to the PSA, or vice versa.

The release coating of the present invention can be used in conjunction with any PSA including, but not limited to, conventional or commercially available OPSAs and SPSAs. References disclosing SPSAs have been cited previously. Reference can be made to the literature for examples of these compositions.

The invention is illustrated in more detail by the following nonlimiting example:

EXAMPLE 1

| Material | Description | Dry % | Wet % |
| --- | --- | --- | --- |
| Hycar 1300x8 | reactive liquid nitrile | 74.00 | 25.88 |
| Toluene | | — | 59.18 |
| Doresco BM8-1 | butylated melamine | 24.00 | 13.54 |
| Doresco G-17 | p-toluenesulfonic acid | 2.00 | 1.40 |

Reactive liquid nitrile (25.88 parts) and toluene (59.18 parts) are mixed together in a suitable vessel until homogenous. To this mixture, 13.54 parts of butylated melamine is added and mixed until the mixture becomes homogenous again. While this mixture is being agitated, 1.40 parts of p-toluenesulfonic acid is added. The resultant primer coating exhibited a total solids of 35%.

Approximately two wet pounds per 3000 ft$^2$ ream of the primer coating is applied to 2 mil PET film from a 200 QCH anilox roll using reverse gravure technique. The coating is quickly dried and cured by processing it through a 350° F. flotation drier for 5 seconds. The resultant dry coating weight is measured to be 0.7 pounds per 3000 ft$^2$ ream.

| Material | Description | Dry % | Wet % |
| --- | --- | --- | --- |
| Doresco AKN29-1 | short oil alkyd | 68.08 | 47.70 |
| Doresco BM8-1 | butylated melamine | 22.08 | 12.47 |
| Zonyl 7040 | perfluorinated ester | 8.00 | 14.91 |
| Doresco G-17 | p-toluenesulfonic acid | 1.84 | 1.29 |
| Toluene | | — | 24.53 |

Short oil alkyd (47.7 parts) and butylated melamine (12.47 parts) are mixed together in a suitable vessel until homogenous. To this mixture, 14.01 parts of Zonyl 7040 is added and mixed until the mixture becomes homogenous again. While this mixture is being agitated, 1.20 parts of p-toluenesulfonic acid is added. Toluene (24.53 parts) is added so that the release coating exhibits a total solids of 35%.

Approximately two wet pounds per 3000 ft$^2$ ream of the release coating is deposited on the dried and cured primer coating from a 200 QCH anilox roll using direct gravure technique. The coating is quickly dried and cured by processing it through a 350° F. flotation drier for 5 seconds. The resultant dry coating weight is measured to be 0.7 pounds per 3000 ft$^2$ ream.

The release coating is measured for any tendency to detackify an SPSA by placing a ½ " strip of any commercially available SPSA tape onto the release surface. The strip of tape is then rolled down, once each direction, with a 10 pound, rubber coated roller at a speed of 12" per minute. The SPSA tape is then carefully "popped" so as not to fracture it, and placed onto a stainless steel panel. A virgin (control) strip of the SPSA tape is then placed on the same stainless steel panel along side the tape which was exposed to the release surface. Both strips of tape are rolled down, once in each direction, with a 4½ pound, rubber coated roller at a speed of 12" per minute. A panel adhesion is measured on each strip of tape and the values compared. If the adhesion value of the control tape exceeds the adhesion value of the tape exposed to the release surface by more than 5% then detackification is suspected. No signs of detackification were observed.

To the side of the PET film opposite the primer and the release coating, 85 wet pounds per 3000 ft² ream of the

| Material | Description | Dry % | Wet % |
|---|---|---|---|
| PSA 590 | polydimethylsiloxane PSA | 98.0% | 65.46 |
| Toluene | | — | 33.74 |
| Lucidol 98 | benzoyl peroxide | 2.0 | 0.80 |

The adhesive was dried at 190° F. for 2 minutes and cured at 330° F. for 2 minutes resulting in a dry coating weight of 34 pounds per 3000 ft² ream.

The coated tape was slit into one inch widths and wound on 3" cores. The finished tape exhibited the following properties. All properties were measured at 72° F. and 50% r.h. except where noted.

| Property | oz/inch |
|---|---|
| panel adhesion to stainless steel | 45.4 |
| quick stick to stainless steel | 20.2 |
| high speed unwind @ 50 fpm | 4.2 |
| initial adhesion to release | 2.0 |
| adhesion to release after 24 hours | 9.0 |
| adhesion to release after 1 week | 5.0 |
| adhesion to release after 24 hours @ 70 C. | 18.0 |
| adhesion to release after 1 week @ 70 C. | 16.0 |

EXAMPLE 2

Approximately 16.5 wet pounds per 3000 ft² ream of the release coating from Example 1 is deposited on the felt side of a 45 pound, SBR saturated, fine structured crepe backing by applying it with a smooth applicator roll and doctoring it from the substrate with a #18 and #9 dual Mayer rod set-up. The coating is quickly dried and cured by processing it through a 350° F. flotation drier for 5 seconds. The resultant dry coating weight is measured to be 5.8 pounds per 3000 ft² ream.

The finished tape from Example 1 was applied to the release coated SCK. The following properties were measured:

| Property | oz/inch |
|---|---|
| initial adhesion to release | 1.0 |
| adhesion to release after 24 hours | 2.0 |
| adhesion to release after 1 week | 2.5 |
| adhesion to release after 24 hours @ 70 C. | 5.5 |
| adhesion to release after 1 week @ 70 C. | 5.5 |

To the wire side of the crepe backing, the side opposite the release coating, 85 wet pounds per 3000 ft² ream of the following SPSA was cast:

| Material | Description | Dry % | Wet % |
|---|---|---|---|
| Dow 282 | polydimethylsiloxane PSA | 98.0 | 70.00 |
| Toluene | | — | 29.20 |
| Cadox TS-50 | 2,4-dichlorobenzoyl peroxide | 2.0 | 0.80 |

The adhesive was dried at 190° F. for 2 minutes and cured at 350° F. for 1 minute resulting in a dry coating weight of 34 pounds per 3000 ft² ream.

The coated tape was slit into one inch widths and wound on 3" cores. The finished tape exhibited the following properties. All properties were measured at 72° F. and 50%.

| Property | oz/inch |
|---|---|
| panel adhesion to stainless steel | 31.2 |
| quick stick to stainless steel | 7.7 |
| high speed unwind @ 50 fpm | 5.0 |

EXAMPLE 3

Approximately two wet pounds per 3000 ft² ream of the release coating in Example 1 is applied to the felt side of 3.2 mil super calendered kraft (SCK) from a 200 QCH anilox roll using reverse gravure technique. The coating is quickly dried and cured by processing it through a 350° F. flotation drier for 5 seconds. The resultant dry coating weight is measured to be 0.7 pounds per 3000 ft² ream.

The finished tape from Example 1 was applied to the release coated SCK. The following properties were measured:

| Property | oz/inch |
|---|---|
| initial adhesion to release | 1.5 |
| adhesion to release after 24 hours | 8.0 |
| adhesion to release after 1 week | 13.5 |

Having described the invention in detail and by reference to preferred embodiments thereof, it will be apparent that modifications and variations are possible without departing from the scope of the invention defined in the appended claims.

What is claimed is:

1. A laminate comprising a substrate, a continuous layer of a release coating on one surface thereof, and a layer of a silicone pressure sensitive adhesive on the surface of said release coating, said release coating being a mixture of a resin having perfluoro side chains and a film forming resin which binds said resin having said perfluoro side chains to said substrate, wherein said film forming resin is selected from the group consisting of polyester, polyamides, functionalized polyolefins, and nitrile polymers and copolymers.

2. The laminate of claim 1 wherein said film forming resin is a polyester.

3. The laminate of claim 2 wherein said film forming resin is the reaction product of an alkyd resin and an aminoplast resin.

4. The laminate of claim 3 wherein said resin having perfluoro side chains is a polymer of a perfluoroalkyalkyl acrylate or methacrylate.

5. The laminate of claim 4 wherein said aminoplast resin is butylated melamine formaldehyde resin.

6. The laminate of claim 5 wherein said perfluoropolymer is present in said composition in an amount of about 2 to 10% by dry weight, said alkyd resin is present in an amount of about 40 to 90% by dry weight, and said aminoplast resin is present in an amount of about 10 to 50% by dry weight.

7. A backing for a silicone pressure sensitive tape or a silicon pressure sensitive adhesive release liner comprising a substrate having a continuous release coating on a surface thereof comprising a cured composition of a mixture of a resin having perfluoro side chains, a polyester resin and an aminoplast resin.

8. The backing of claim 7 wherein said polyester resin is an alkyd resin.

9. The backing of claim 8 wherein said resin having perfluoro side chains is a polymer of a perfluoroalkylalkyl acrylate or methacrylate ester.

10. The backing of claim 9 wherein said alkyd resin is a coconut oil alkyd resin.

11. The backing of claim 10 wherein said aminoplast is butylated melamine formaldehyde resin.

12. The backing of claim 11 wherein said perfluoropolymer is present in said composition in an amount of about 2 to 10% by dry weight, said alkyd resin is present in an amount of about 40 to 90% by dry weight, and said aminoplast resin is present in an amount of about 10 to 50% by dry weight.

13. The backing of claim 12 wherein said substrate is a polyethyleneterephthalate film and a primer layer is interposed between said coating and said substrate.

14. The backing of claim 13 wherein said primer coating is a cured composition of an amine or carboxyl terminated butadiene-acrylonitrile resin and an aminoplast resin.

15. A pressure-sensitive adhesive tape comprising a flexible substrate having a first surface and a second surface, said first surface having a continuous layer of a release coating thereon and said second surface having a layer of a silicone pressure-sensitive adhesive thereof, said release coating being a cured composition of a film forming resin and a resin having perfluoro side chains wherein said film forming resin is selected from the group consisting of polyester, polyamides, functionalized polyolefins, and nitrile polymers and copolymers.

16. The tape of claim 15 wherein said film forming resin is a polyester.

17. The tape of claim 16 wherein said film forming resin is the reaction product of an alkyd resin, an aminoplast resin and a curing agent.

18. The tape of claim 17 wherein said resin having perfluoro side chains is a polymer of a perfluoroalkyalkyl acrylate or methacrylate.

19. The tape of claim 18 wherein said alkyd resin is a coconut oil alkyd resin.

20. The tape of claim 19 wherein said aminoplast resin is butylated malamine formaldehyde resin.

21. The tape of claim 20 wherein said perfluoropolymer is present in said composition in an amount of about 2 to 10% by dry weight, said alkyd resin is present in an amount of about 40 to 90% by dry weight, and said aminoplast resin is present in an amount of about 10 to 50% by dry weight.

22. The tape of claim 15 wherein said silicone pressure sensitive adhesive contains a resin having perfluoro side chains.

23. The tape of claim 15 wherein said substrate is a polyethyleneterephthalate film and a primer layer is interposed between said coating and said substrate.

24. The tape of claim 23 wherein said primer coating is a cured composition of an amine or carboxyl terminated butadiene-acrylonitrile resin and an aminoplast resin.

* * * * *

UNITED STATES PATENT AND TRADEMARK OFFICE
CERTIFICATE OF CORRECTION

PATENT NO. : 5,656,347
DATED : August 12, 1997
INVENTOR(S) : John K. Tynan, Jr.

It is certified that error appears in the above-indentified patent and that said Letters Patent is hereby corrected as shown below:

Claim 7, Col. 10, Line 61 - "silicon" should be --silicone--.

Signed and Sealed this

Twenty-eighth Day of October, 1997

*Attest:*

BRUCE LEHMAN

*Attesting Officer*  Commissioner of Patents and Trademarks